Figure 1:
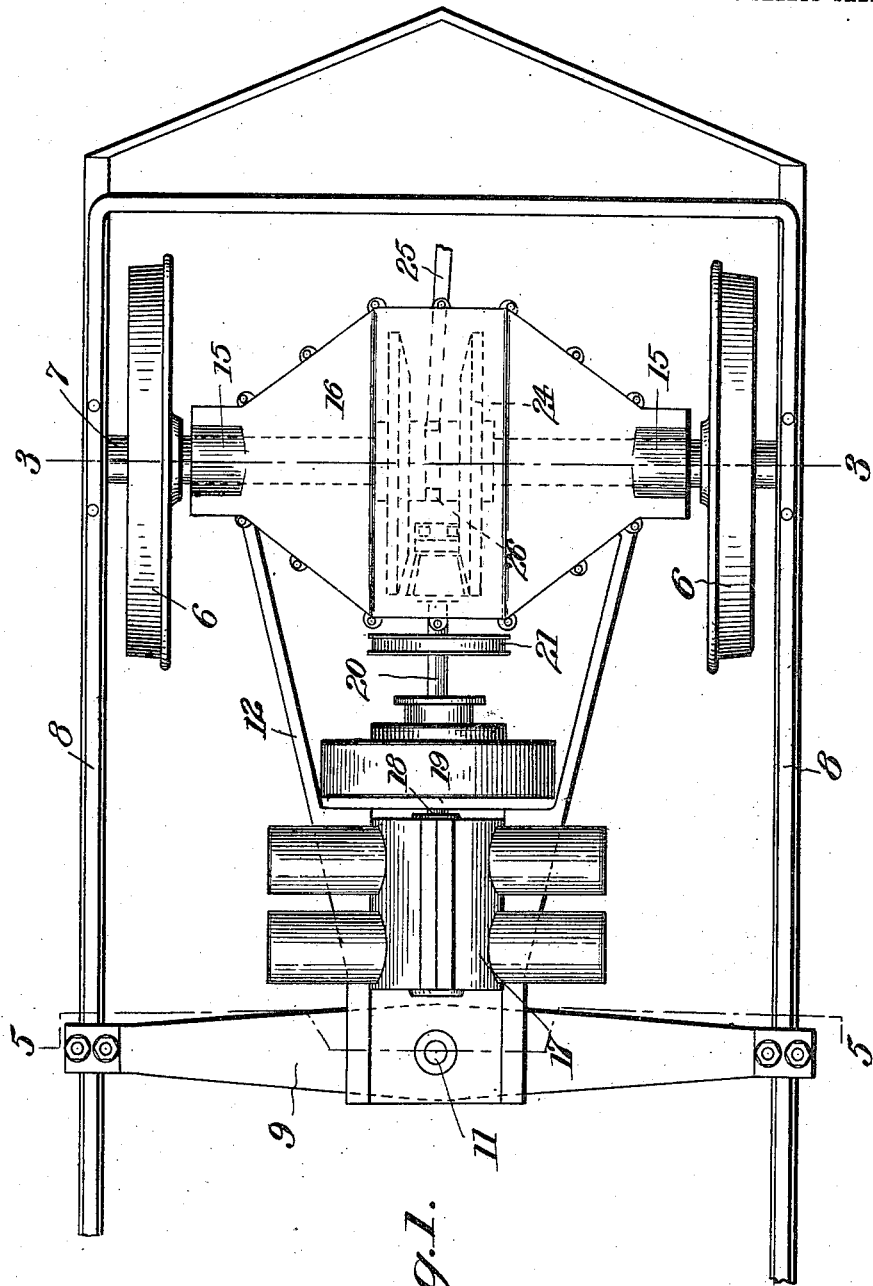

W. W. HENDERSON.
ENGINE SUPPORT FOR CAR TRUCKS.
APPLICATION FILED DEC. 20, 1910.

987,802.

Patented Mar. 28, 1911.

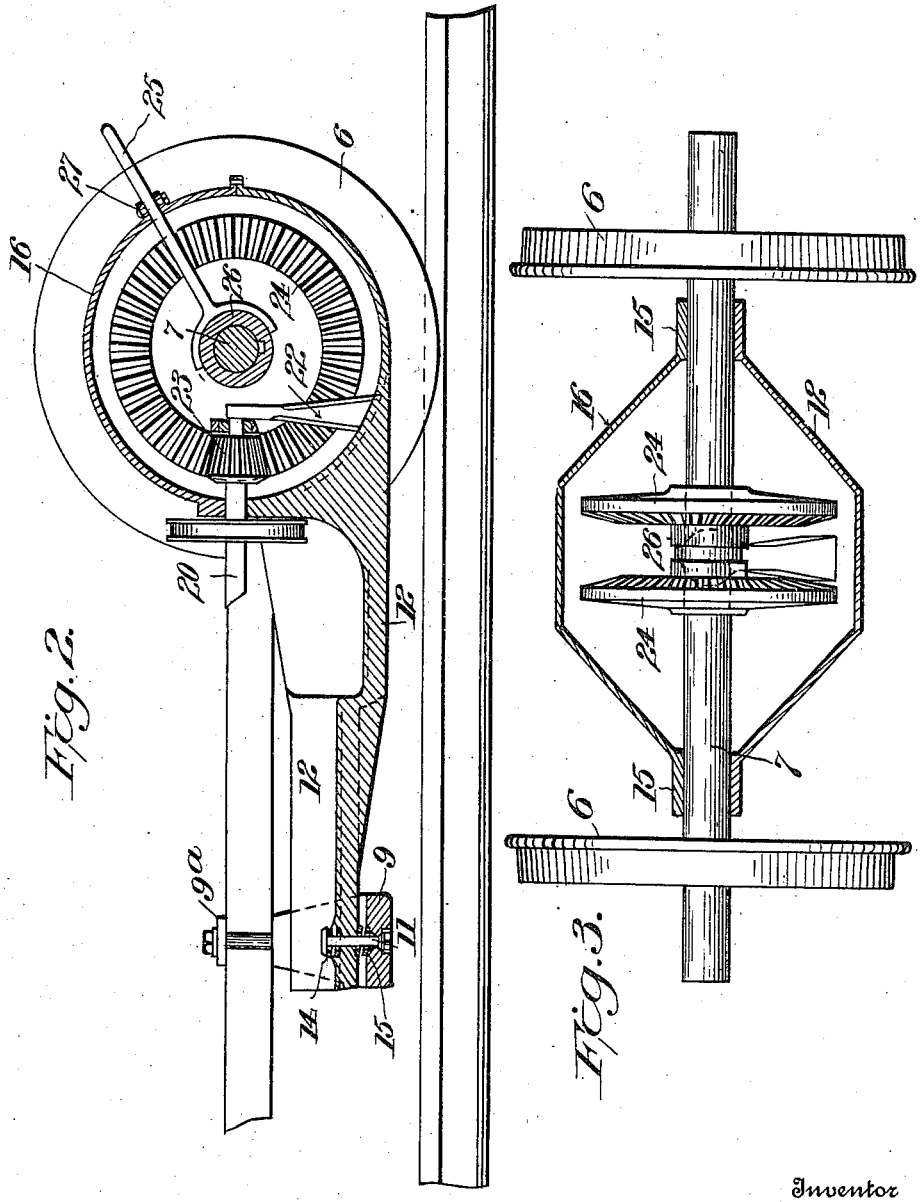

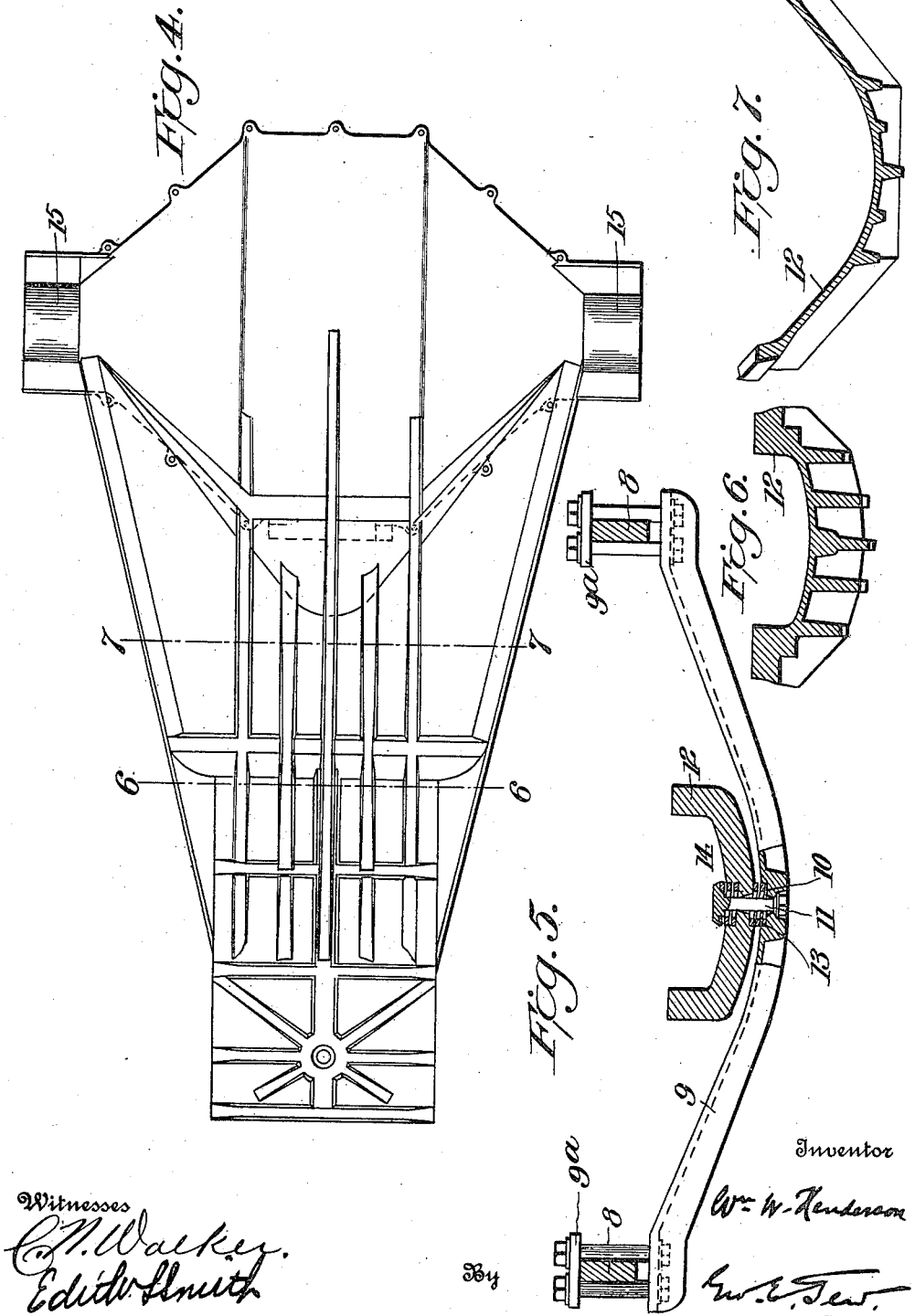

UNITED STATES PATENT OFFICE.

WILLIAM W. HENDERSON, OF WASHINGTON, DISTRICT OF COLUMBIA, ASSIGNOR TO HYDRAULIC CLUTCH DRIVE CO., OF WASHINGTON, DISTRICT OF COLUMBIA, A CORPORATION OF DELAWARE.

ENGINE-SUPPORT FOR CAR-TRUCKS.

987,802. Specification of Letters Patent. Patented Mar. 28, 1911.

Application filed December 20, 1910. Serial No. 598,460.

*To all whom it may concern:*

Be it known that I, WILLIAM W. HENDERSON, citizen of the United States, residing at Washington, District of Columbia, have invented certain new and useful Improvements in Engine-Supports for Car-Trucks, of which the following is a specification.

This invention relates to engine supports for car trucks, and has for its object to provide improved means for supporting a gas engine on a car truck in such manner that the engine may be utilized for driving the car, without interfering with the ordinary functions of the truck or the car body mounted thereon.

The invention includes the idea of a three point suspension for the engine support, two of the points being on the axle, and another point on a cross beam between the side bars of the truck, all so arranged that the engine will not be affected by vibrations of the car body or the truck, but will be held in proper and fixed relation with respect to the driving axle, under all conditions. The engine shaft is geared directly to the driven axle, without intermediate change speed gearing, the change of speed being effected by a proper form of clutch, and reverse movement being provided for by shifting gears on the driven axle.

An embodiment of the invention is illustrated in the accompanying drawings in which—

Figure 1 is a plan view of part of a truck provided with the improvement. Fig. 2 is a central vertical longitudinal section, parts being omitted. Fig. 3 is a section on the line 3—3 of Fig. 1. Fig. 4 is an inverted plan view of the cradle for supporting the engine and associated parts. Fig. 5 is a section on the line 5—5 of Fig. 1. Fig. 6 is a section on the line 6—6 of Fig. 4. Fig. 7 is a section on the line 7—7 of the same figure.

The invention is capable of application to various types of trucks and no particular description thereof is deemed necessary, except to say that 6 represents driving wheels on the driving axle 7 which will be carried in suitable bearings on the truck frame, the side bars of which are indicated at 8.

9 indicates a cross beam between the side bars 8 and connected thereto by clips 9ª. The beam is dropped at the middle, and is provided with a boss or enlargement having a conical hole or bearing 10 for a bolt 11, the conical or enlarged hole permitting the bolt to have a certain amount of play. One end of the cradle 12 is supported by the beam, being connected thereto by the bolt 11, a spring 13 being located between the cradle and the beam, and another spring 14 between the cradle and the head of the bolt, producing a spring support or fastening which will permit a limited yielding movement of the cradle, to take up changes or variations of position incident to vibration or strain between the cradle or axle and the beam. As shown particularly in Figs. 4, 6 and 7 the cradle is ribbed on the underside for the sake of strength. The cradle is substantially triangular in outline and at its wide end is enlarged to form a housing, with bearings 15 for the axle 7, and a top plate or cover 16 which incloses the gears on the axle.

The engine is indicated at 17, and it is mounted on the narrow end of the cradle, by any suitable fastening devices, the engine being a gas engine of any suitable type, such as a four cylinder double-opposed engine with horizontal cylinders as illustrated. The engine is illustrated somewhat diagrammatically, as the details thereof are not material. It drives the crank shaft 18 which is connected to one member of a combined fluid clutch and fly wheel 19, which is preferably a clutch of the type illustrated in my U. S. Patent No. 879,045 or my U. S. application No. 586,773, filed Oct. 12, 1910, to which reference is made for details with respect to the construction and manner of operation of the clutch. The other member of the clutch, is connected to a shaft section 20 which may have a brake wheel 21 thereon. This shaft section extends into the housing referred to, and is supported in bearings thereon, the inner bearing being mounted on a block or standard 22 projecting from the bottom of the cradle. The inner end of said shaft has a drive pinion 23 thereon, which may be engaged with one or the other of a pair of beveled gears 24 non-rotatably mounted on the axle 7. These gears may be shifted axially on the axle to engage either with the pinion, by any suitable means, such for example as the shifting lever 25 engaging a connecting sleeve 26 between the gears, and extending through a hole in the cover 16 and pivoted as at 27. The shifting lever will be connected by suitable links and levers extending to convenient position for operation by the motorman.

By the means described the engine is held in fixed relation to the axle, being mounted wholly on the truck, and in consequence of the flexible connection at the bolt 11 any distortion of the truck will have no effect on the relative position of the engine and axle and will not disturb the driving connections therebetween. The three point suspension prevents racking of the cradle, which at all times follows the movement of the axle with respect to position in the truck frame, vibration of the frame being absorbed by the springs around the pivot bolt 11.

By means of the fluid clutch above described power may be transmitted from the engine to the axle at any speed desired, a substantially direct connection from the engine to the axle being provided, without the complications incident to the use of change speed gearing requiring additional supporting devices on the truck.

Having thus described my invention, what I claim as new and desire to secure by Letters Patent is:—

1. The combination of a car-truck frame, an axle and wheels supporting the same, a bevel gear on the axle, a casing having at one end a two-point bearing on the axle, a beam extending across the frame and flexibly supporting at one point the other end of the casing, a gas engine supported on the casing, and transmission devices supported on the casing, between the engine and the bevel gear, said transmission devices being located in a single axial line, with respect to the engine shaft.

2. The combination of a car truck frame, an axle and wheels supporting the same, shifting bevel gears on the axle, a casing having at one end a housing inclosing said axle and gears, and spaced bearings on the axle, a cross beam on the frame, supporting the other end of the casing, a shaft extending lengthwise with respect to the truck, bearings in said housing for said shaft, a pinion on the shaft, between said gears and engageable by either, and an engine supported by the casing and operatively connected to the shaft.

In testimony whereof, I affix my signature in presence of two witnesses.

WILLIAM W. HENDERSON.

Witnesses:
GEO. E. TEW,
EDITH S. SMITH.

---

Copies of this patent may be obtained for five cents each, by addressing the "Commissioner of Patents, Washington, D. C."